2,881,206
PROCESS FOR PREPARING STABLE HIGH DETERGENCY BARIUM SULFONATES

Manley Kjonaas, Hammond, Ind., and Lee V. Brown, Chicago, Ill., assignors to Sinclair Refining Company, New York, N.Y., a corporation of Maine No Drawing. Application April 8, 1957
Serial No. 651,129

4 Claims. (Cl. 260—504)

This invention relates to mineral oil additive agents and more particularly to a novel method for preparing basic barium petroleum sulfonates of increased metal content.

Among the known detergent-dispersant type additive agents which have been used in the preparation of lubricants and other mineral oil compositions are the basic salts or soaps of oil-soluble petroleum sulfonic acids. When added in small amounts to the mineral oil, the basic sulfonates impart to the oil detergent properties which keep pistons, rings and valves free of lacquer, varnish and sludge-like deposits. Generally, the basic sulfonates are prepared by neutralizing the oil-soluble sulfonic acids, referred to as mahogany acids, with an excess of neutralizing agent employed in the form of a basic inorganic compound such as the oxide, hydroxide or carbonate, of the desired metal, so as to obtain products which contain more metal than that theoretically required to form the normal salt or replace the acidic hydrogens of the sulfonic acid. Work of this general type has been described in Patent No. 2,617,049 and more recently in Patent No. 2,695,910 wherein high metal-containing salts have been prepared by treating organic salt complexes with a material possessing acid characteristics under process conditions.

In accordance with this invention, we have found that the metal content of basic barium salts of oil-soluble petroleum sulfonic acids can be greatly increased by a new method of preparation which involves repeated alternate carbonation and neutralization of the basic metal-containing oil-soluble sulfonate. The basic sulfonates prepared in accordance with this invention are characterized by a high metal content, e.g. up to double the normal value, and when blended in small amounts in mineral lubricating oils good stability is imparted to the oil and formation of acidic oxidation products is reduced.

In carrying out the method of our invention the basic oil-soluble sulfonates can be employed as starting materials. These materials are well known and may be prepared by sulfonation of a suitable petroleum oil fraction, for instance boiling in the range of about 600 to 1000° F.; with oleum, gaseous sulfur trioxide, etc., to form oil-soluble sulfonic acids which are conveniently obtained as a concentrate varying from about 10 to 50 percent by weight in the mineral oil from which they are derived. After separation from the acid sludge which is formed, the oil-soluble sulfonic acids or mahogany acids are neutralized with a theoretical excess of a basic inorganic compound of barium such as the oxide, hydroxide or carbonate. The amount of neutralizing agent employed may be as high as 600 percent in excess of that required to form the normal salt although preferably the amount of inorganic compound usually represents an excess of at least about 150 percent or 300 percent, based on the acid number of the mahogany acids. In this manner, the amount of barium metal incorporated in the product will be equal to at least 1.5 times the theoretical amount present in the normal salt or sulfonate. The neutralization treatment is generally carried out at a temperature not substantially in excess of 300° F., and preferably at temperatures between about 100 and 200° F. Although neutralization can be effected at higher temperatures as, for example, by heating under liquid phase conditions, it has been found more convenient to employ atmospheric pressure in such operations.

In order to prepare high metal-containing sulfonates in accordance with our invention, the basic metal sulfonate is alternately carbonated and reneutralized in a series of steps which involves at least two, and preferably three, repeated recarbonation and reneutralization treatments. The carbonation treatment may be carried out in any known manner, such as, for example, by bubbling carbon dioxide through a concentrated solution of the basic sulfonate in a petroleum solvent at temperatures ranging from 70 to 300° F. or more, up to temperatures below the decomposition temperature of the sulfonate. Preferably, however, carbonation of the basic sulfonate is effected by contacting the sulfonate with carbon dioxide gas at atmospheric or elevated pressure until the strong basicity of the basic sulfonate to phenolphthalein is destroyed and a final pH of about 7 to 8.5 is obtained.

After the basic sulfonate has been treated with carbon dioxide gas, the carbonated sulfonate is then reneutralized with the barium neutralizing agent which, as above stated, is in the form of the metal oxide, hydroxide or carbonate. Based on the acid number of the original sulfonic acids, the amount of neutralizing agent employed may vary from about the theoretical amount up to 600 percent in excess of the theoretical amount required to form the normal salt. Generally, however, the carbonated sulfonate is reneutralized with a theoretical or equivalent amount of barium neutralizing agent since higher amounts have been found unnecessary. The reneutralization reaction is usually carried out in the presence of water at temperatures of about 100 to 200° F. and the product is obtained upon filtration of the reaction mixture.

The following examples illustrate the preparation of basic barium sulfonates characterized by high metal content through the method of preparation involving repeated alternate carbonation with carbon dioxide and contacting with a barium neutralizing agent.

EXAMPLE I

*Preparation of acid oil.*—A 270 SUS at 100° F. viscosity Sweet West Texas gas oil fraction was treated with four 28 lb. per barrel dumps of 20 percent oleum. The sludge was removed after each oleum dump. The acid-treated oil was freed of $SO_2$ by blowing with air to leave a solution of approximately 10 percent mahogany sulfonic acid in oil and having an acid number of 12.9.

EXAMPE II

*Preparation of basic barium sulfonate.*—4000 grams of the acid oil from Example I was neutralized by mixing with 212 grams BaO (300% theoretical) and 424 cc. water in an open beaker while slowly heating from room temperature to 300° F. It was then filtered with filter aid to yield a basic barium sulfonate product which analyzed as follows:

Percent barium _____ 2.87
Base No. (ASTM D663) _____ 7.67
Base No. to pH 4 _____ 10.7

EXAMPLE III

*First carbonation with $CO_2$.*—4000 grams of the basic barium sulfonate from Example II was carbonated by passing $CO_2$ into it through a glass tube while stirring at 150° F. After two hours the reaction mixture had gained 20 grams in weight and no longer turned phenolphthalein indicator pink. Analysis of the carbonated barium sulfonate was as follows:

Percent barium _____ 2.86
Base No. (ASTM D663) _____ 0.14
Base No. to pH 4 _____ 11.3

EXAMPLE IV

*Second contacting with barium hydroxide.*—The carbonated barium sulfonate from Example III was recontacted with 146 grams Ba(OH)$_2$—8H$_2$O (approximately 100% theoretical barium based on the original acid number of the acid oil) by adding 100 grams water and then the Ba(OH)$_2$—8H$_2$O while stirring the mixture in an open beaker at 140–150° F. The mixture was stirred for 5 hours at 140–160° F. and then slowly heated to 300° F. and held there for ½ hour. After filtering with filter aid, the product analyzed as follows:

| | |
|---|---|
| Percent barium | 3.95 |
| Base No. (ASTM D663) | 6.30 |
| Base No. to pH 4 | 16.3 |

EXAMPLE V

*Second carbonation with CO$_2$.*—2000 grams of product from Example No. 4 was recarbonated by bubbling CO$_2$ through it while being stirred in an open beaker for 1¼ hours at room temperature. The sample gained 9 grams in weight and no longer turned phenolphthalein indicator pink. The product analyzed as follows:

| | |
|---|---|
| Percent barium | 4.00 |
| Base No. (ASTM D663) | 0.42 (acid) |
| Base No. to pH 4 | 11.2 |

EXAMPLE VI

*Third contacting with barium hydroxide.*—1000 grams of the product from Example V was recontacted with barium hydroxide by mixing with 73 grams $$Ba(OH)_2—8H_2O$$

(approximately 100% theoretical based on the acid number of the original acid oil) and 50 cc. water for 2 hours at 140 to 160° F. and then ½ hour at 300° F. The product was filtered with filter aid to yield a product which analyzed as follows:

| | |
|---|---|
| Percent barium | 4.95 |
| Base No. (ASTM D663) | 4.65 |
| Base No. to pH 4 | 13.8 |

EXAMPLE VII

*Third carbonation with CO$_2$.*—Approximately 500 grams of the product from Example VI was recarbonated by bubbling CO$_2$ into it for 1 hour at room temperature. It no longer turned phenolphthalein indicator pink and analyzed as follows:

| | |
|---|---|
| Percent barium | 4.93 |
| Base No. (ASTM D663) | 0.83 (acid) |
| Base No. to pH 4 | 10.1 |

EXAMPLE VIII

*Fourth contacting with barium hydroxide.*—341 grams of the product from Example VII was recontacted with 20 grams of Ba(OH)$_2$—8H$_2$O (equivalent to 50% of the barium in the sample) and 10 cc. water for 3 hours at 150–180° F. and then for ¾ hour at 300° F. the product was filtered with filter aid to yield a product which analyzed as follows:

| | |
|---|---|
| Percent barium | 6.03 |
| Base No. (ASTM D663) | 1.18 |
| Base No. to pH 4 | 12.5 |

As seen above from Examples II and VIII wherein the initial product analyzed 2.8 percent barium as compared to 6.03 percent barium for the final product, the repeated alternate carbonation and reneutralization more than doubled the barium content of the basic sulfonate. In Example I, the sulfonate was prepared from an oleum-treated gas oil. Similarly, in preparing basic sulfonates derived from sulfur trioxide-treated base oils, good results of 50 percent increased barium content have been obtained after two treatments of the basic sulfonate with the alternate carbonation and neutralization steps.

Lubricating oil compositions containing small amounts of the high metal-containing basic sulfonates prepared in accordance with this invention have been found to provide valuable detergent oils having good cleanliness ratings. The sulfonates prepared by our invention may be employed in lubricants, including greases and oils, which contain other well-known additive agents such as pour depressors, viscosity index improvers, anti-oxidants, extreme pressure agents and the like. Generally, the detergent sulfonates as herein prepared are used in mineral base oils in small proportions sufficient to provide a barium content of about 0.05 to 2 percent by weight, and preferably about 0.1 to 1.5 percent by weight.

The following data illustrate that basic sulfonates prepared in accordance with this invention provide greater oxidation stability than the conventional basic sulfonates as prepared, for instance, in Example II.

In Table I, four mineral oil compositions were prepared which contained the products of Examples II, IV, VI and VII, respectively, blended to a barium level of 0.95 percent. In addition thereto, each blend also contained 1.25 percent of sulfurized sperm oil (12% sulfur) and 2.2 percent of a zinc dialkyldithiophosphate which was prepared by reacting about four moles of mixed C$_6$ and C$_7$ alcohols with one mole of P$_2$S$_5$ at a temperature of about 160 to 170° F. The product was obtained as a concentrate in mineral oil, approximately about 49 percent, and analyzed about 4.4 percent phosphorus. The base oil was a solvent-treated Mid-Continent neutral having a viscosity of 160 SUS at 100° F. As will be noted from the following table, each blend was subjected to an oxygen absorption test carried out at 360° F. with a copper-lead catalyst. As shown, the rate of oxidation of oil blends containing the basic barium sulfonates of this invention is appreciably slower than conventional blend No. II, which thus indicates their greater oxidation stability and reduced tendency to form acidic oxidation products.

*Table I.—Oxygen absorption tests on SAE 10 motor oil blends at 360° F. with Cu—Pb catalyst*

| Basic barium sulfonate as prepared in example | Rate of oxygen absorption by 100 g. oil |
|---|---|
| II | 2,200 cc. in 179 min. |
| IV | 2,200 cc. in 300 min. |
| VI | 1,881 cc. in 300 min. |
| VII | 2,200 cc. in 201 min. |

We claim:

1. In a method of preparing petroleum sulfonates wherein an oil-soluble basic barium sulfonate is carbonated with carbon dioxide and thereafter neutralized with a barium neutralizing agent, the improvement which comprises the successive steps of recarbonating the carbonated-neutralized basic barium sulfonate with carbon dioxide gas and reneutralizing said recarbonated sulfonate with a barium neutralizing agent.

2. The method of claim 1 which comprises the additional steps of recarbonating said last named neutralized barium sulfonate and reneutralizing said sulfonate with a barium neutralizing agent.

3. The method of claim 1 wherein approximately a theoretical amount of barium neutralizing agent is employed in said neutralizations.

4. The method of claim 2 wherein approximately a theoretical amount of barium neutralizing agent is employed in said neutralizations.

References Cited in the file of this patent

UNITED STATES PATENTS

| | | |
|---|---|---|
| 2,501,732 | Mertes | Mar. 28, 1950 |
| 2,695,910 | Asseff et al. | Nov. 30, 1954 |